(12) United States Patent
Abrams

(10) Patent No.: US 7,410,682 B2
(45) Date of Patent: Aug. 12, 2008

(54) FLOCKED STRETCHABLE DESIGN OR TRANSFER

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 302 days.

(21) Appl. No.: 10/613,981

(22) Filed: Jul. 3, 2003

(65) Prior Publication Data

US 2004/0055692 A1 Mar. 25, 2004

Related U.S. Application Data

(60) Provisional application No. 60/403,992, filed on Aug. 16, 2002, provisional application No. 60/405,473, filed on Aug. 23, 2002.

(51) Int. Cl.
*B32B 3/10* (2006.01)
*B32B 3/26* (2006.01)
*B32B 5/02* (2006.01)
*B32B 5/04* (2006.01)
*B32B 33/00* (2006.01)

(52) U.S. Cl. .............. 428/90; 428/95; 428/198

(58) Field of Classification Search .............. 428/90, 428/95, 343, 346, 347, 348, 349, 351, 352, 428/353, 354, 355 R, 355 RA, 195.1, 198; 442/149, 150, 151

See application file for complete search history.

(56) References Cited

U.S. PATENT DOCUMENTS

| | | | |
|---|---|---|---|
| 1,905,999 A | 4/1933 | Ellis | |
| 2,592,602 A | 4/1952 | Saks | |
| 2,636,837 A | 4/1953 | Summers | 154/123 |
| 2,999,763 A | 9/1961 | Sommer | |
| 3,215,584 A | 11/1965 | McConnell et al. | |
| 3,314,845 A | 4/1967 | Perri | |
| 3,377,232 A | 4/1968 | Mencock et al. | |
| 3,459,579 A | 8/1969 | Newman | |
| 3,496,054 A | 2/1970 | Baigas | |
| 3,529,986 A | 9/1970 | Kappas et al. | 117/17 |
| 3,565,742 A | 2/1971 | Stephens et al. | |
| 3,622,434 A | 11/1971 | Newman | |

(Continued)

FOREIGN PATENT DOCUMENTS

| | | |
|---|---|---|
| AT | E 93 557 | 8/1988 |
| AT | E 135 427 | 8/1996 |
| AU | 606651 | 2/1991 |
| AU | 653994 | 10/1994 |
| BE | 0506601 | 3/1996 |

(Continued)

OTHER PUBLICATIONS

U.S. Appl. No. 09/621,830, filed Jul. 24, 2000, Abrams.
U.S. Appl. No. 09/629,746, filed Jul. 31, 2000, Abrams.
U.S. Appl. No. 09/735,721, filed Dec. 13, 2000, Abrams.
U.S. Appl. No. 10/265,206, filed Oct. 4, 2002, Abrams.
U.S. Appl. No. 10/394,357, filed Mar. 21, 2003, Abrams.

(Continued)

*Primary Examiner*—Cheryl Juska
(74) *Attorney, Agent, or Firm*—Sheridan Ross P.C.

(57) ABSTRACT

The present invention describes a flocked stretchable design and a process for producing a flocked stretchable design or transfer. The design, when configured as a transfer, includes a carrier layer, a release adhesive applied to the carrier layer, a plurality of flock fibers releasably attached to the release adhesive, an elastic film, and a first adhesive layer bonded to the flock fibers and the elastic film, and a second, discontinuously distributed, adhesive layer bonded to the other side of the elastic film. The design, when direct flocked, does not include the carrier and the release adhesive. The present invention also includes methods of producing both the designs.

37 Claims, 5 Drawing Sheets

U.S. PATENT DOCUMENTS

| | | | |
|---|---|---|---|
| 3,644,267 A | 2/1972 | Jackson, Jr. et al. | |
| 3,657,060 A | 4/1972 | Haigh | 161/73 |
| 3,660,200 A | 5/1972 | Anderson et al. | |
| 3,674,611 A | 7/1972 | Petry et al. | |
| 3,772,132 A | 11/1973 | Dulin, Jr. | |
| 3,775,205 A | 11/1973 | Hermann et al. | 156/72 |
| 3,793,050 A | 2/1974 | Mumpower, Jr. | 117/17.5 |
| 3,803,453 A | 4/1974 | Hull | |
| 3,816,211 A | 6/1974 | Haigh | 156/309 |
| 3,837,946 A | 9/1974 | Gribbin | |
| 3,887,737 A | 6/1975 | Baxter et al. | |
| 3,900,676 A | 8/1975 | Alderson | |
| 3,903,331 A | 9/1975 | Klein | |
| 3,917,883 A | 11/1975 | Jepson | |
| 3,936,554 A | 2/1976 | Squier | |
| 3,956,552 A | 5/1976 | Geary | 428/88 |
| 3,961,116 A * | 6/1976 | Klein | 428/90 |
| 3,969,559 A | 7/1976 | Boe | |
| 3,979,538 A | 9/1976 | Gilman et al. | |
| 3,989,869 A | 11/1976 | Neumaier et al. | 428/254 |
| 4,018,956 A | 4/1977 | Casey | 428/86 |
| 4,025,678 A | 5/1977 | Frank | |
| 4,031,281 A | 6/1977 | Keeling | |
| 4,034,134 A * | 7/1977 | Gregorian et al. | 428/86 |
| 4,035,532 A * | 7/1977 | Gregorian et al. | 428/90 |
| 4,062,992 A | 12/1977 | Power et al. | |
| 4,088,708 A | 5/1978 | Riew | |
| 4,120,713 A | 10/1978 | Jensen et al. | |
| 4,142,929 A | 3/1979 | Otomine et al. | 156/72 |
| 4,201,810 A | 5/1980 | Higashiguchi | 428/90 |
| 4,218,501 A | 8/1980 | Kameya et al. | |
| 4,269,885 A | 5/1981 | Mahn | 428/216 |
| 4,273,817 A | 6/1981 | Matsuo et al. | 428/90 |
| 4,282,278 A | 8/1981 | Higashiguchi | 428/90 |
| 4,292,100 A | 9/1981 | Higashiguchi | 156/72 |
| 4,314,813 A | 2/1982 | Masaki | 8/468 |
| 4,340,632 A | 7/1982 | Wells et al. | |
| 4,362,773 A | 12/1982 | Shikinami | |
| 4,362,924 A | 12/1982 | Story et al. | |
| 4,385,588 A | 5/1983 | Bennetot | 118/638 |
| 4,387,214 A | 6/1983 | Passmore et al. | |
| 4,390,387 A | 6/1983 | Mahn | |
| 4,396,662 A | 8/1983 | Higashiguchi | 128/90 |
| 4,405,401 A | 9/1983 | Stahl | 156/248 |
| 4,423,106 A | 12/1983 | Mahn | |
| 4,430,372 A | 2/1984 | Knoke et al. | |
| 4,438,533 A * | 3/1984 | Hefele | 2/97 |
| 4,465,723 A | 8/1984 | Knoke et al. | |
| 4,574,018 A | 3/1986 | Masuda et al. | 156/72 |
| 4,588,629 A | 5/1986 | Taylor | |
| 4,652,478 A | 3/1987 | Maii | 428/43 |
| 4,668,323 A | 5/1987 | Lenards et al. | 156/242 |
| 4,681,791 A | 7/1987 | Shibahashi et al. | 428/96 |
| 4,687,527 A | 8/1987 | Higashiguchi | 156/72 |
| 4,741,791 A | 5/1988 | Howard et al. | 156/72 |
| 4,810,549 A | 3/1989 | Abrams et al. | 428/88 |
| 4,895,748 A | 1/1990 | Squires | |
| 4,931,125 A | 6/1990 | Volkmann et al. | |
| 4,966,801 A | 10/1990 | Becker et al. | |
| 4,980,216 A | 12/1990 | Römpp | 428/90 |
| 5,008,130 A | 4/1991 | Lenards | 427/206 |
| 5,026,591 A | 6/1991 | Henn et al. | 428/198 |
| 5,041,104 A | 8/1991 | Seal | |
| 5,043,375 A | 8/1991 | Henning et al. | 524/372 |
| 5,047,103 A | 9/1991 | Abrams et al. | 156/72 |
| 5,059,452 A | 10/1991 | Squires | |
| 5,077,116 A | 12/1991 | Lefkowitz | |
| 5,198,277 A | 3/1993 | Hamilton et al. | 428/92 |
| 5,207,851 A | 5/1993 | Abrams | 156/230 |
| 5,248,536 A | 9/1993 | Du Katz | 428/40 |
| 5,346,746 A | 9/1994 | Abrams | 428/195 |
| 5,350,474 A | 9/1994 | Yamane | 156/240 |
| 5,352,507 A | 10/1994 | Bresson et al. | |
| 5,383,996 A | 1/1995 | Dressler | |
| 5,447,462 A | 9/1995 | Smith et al. | |
| 5,489,359 A | 2/1996 | Yamane | 156/540 |
| 5,529,650 A | 6/1996 | Bowers et al. | |
| 5,534,099 A | 7/1996 | Yamamoto | 156/230 |
| 5,597,637 A | 1/1997 | Abrams et al. | 428/90 |
| 5,622,587 A | 4/1997 | Barthelman | 156/251 |
| 5,693,400 A | 12/1997 | Hamilton et al. | 428/89 |
| 5,762,379 A | 6/1998 | Salmon et al. | 283/91 |
| 5,766,397 A | 6/1998 | Jones | 156/230 |
| 5,771,796 A | 6/1998 | Morrison et al. | |
| 5,804,007 A | 9/1998 | Asano | 156/72 |
| 5,858,156 A | 1/1999 | Abrams et al. | 156/230 |
| 5,900,096 A | 5/1999 | Zemel | 156/233 |
| 5,912,065 A | 6/1999 | Kukoff | 428/195 |
| 5,981,009 A | 11/1999 | Iacono et al. | |
| 6,010,764 A | 1/2000 | Abrams | 428/90 |
| 6,083,332 A | 7/2000 | Abrams | 156/72 |
| 6,110,560 A | 8/2000 | Abrams | 428/90 |
| 6,113,149 A | 9/2000 | Dukatz | 283/91 |
| 6,114,023 A | 9/2000 | Schwarz et al. | |
| 6,146,485 A | 11/2000 | Iacono et al. | 156/230 |
| 6,152,038 A | 11/2000 | Wagner et al. | |
| 6,170,881 B1 | 1/2001 | Salmon et al. | 283/91 |
| 6,171,678 B1 | 1/2001 | Holeschovsky et al. | 428/97 |
| 6,202,549 B1 | 3/2001 | Mitsam et al. | 101/27 |
| 6,224,707 B1 | 5/2001 | Lion | 156/230 |
| 6,247,215 B1 | 6/2001 | Van Alboom et al. | |
| 6,249,297 B1 | 6/2001 | Lion | 347/171 |
| 6,264,775 B1 | 7/2001 | Holeschovsky et al. | 156/72 |
| 6,296,908 B1 | 10/2001 | Reihs et al. | 427/393.5 |
| 6,299,715 B1 | 10/2001 | Langsdorf et al. | 156/72 |
| 6,350,504 B1 | 2/2002 | Alboom et al. | |
| 6,376,041 B1 | 4/2002 | Morrison et al. | |
| 6,387,472 B1 | 5/2002 | Reck et al. | 428/195 |
| 6,428,877 B1 | 8/2002 | Suss et al. | 428/195 |
| 6,436,506 B1 | 8/2002 | Pinter et al. | |
| 6,451,148 B1 | 9/2002 | Jenner | 156/230 |
| 6,481,015 B1 * | 11/2002 | Lanier | 2/2.5 |
| 6,676,796 B2 | 1/2004 | Pinter et al. | |
| 6,787,589 B2 | 9/2004 | Weaver et al. | |
| 6,841,240 B2 | 1/2005 | Gorny et al. | |
| 7,229,680 B1 | 6/2007 | Crompton | |
| 2001/0008039 A1 | 7/2001 | Alboom et al. | |
| 2001/0008672 A1 * | 7/2001 | Norvell et al. | 428/90 |
| 2002/0098329 A1 | 7/2002 | Abrams | |
| 2003/0129353 A1 | 7/2003 | Abrams | |
| 2003/0203152 A1 | 10/2003 | Higgins et al. | 428/92 |
| 2004/0170799 A1 * | 9/2004 | Carr et al. | 428/90 |
| 2005/0081985 A1 | 4/2005 | Abrams | |
| 2005/0136211 A1 * | 6/2005 | McGovern et al. | 428/90 |
| 2005/0158508 A1 | 7/2005 | Abrams | |
| 2005/0266204 A1 | 12/2005 | Abrams | |
| 2005/0268407 A1 | 12/2005 | Abrams | |
| 2006/0251852 A1 | 11/2006 | Abrams | |
| 2007/0003761 A1 | 1/2007 | Miyazono et al. | |
| 2007/0022548 A1 | 2/2007 | Abrams | |
| 2007/0026189 A1 | 2/2007 | Abrams | |

FOREIGN PATENT DOCUMENTS

| | | |
|---|---|---|
| CA | 757595 | 4/1967 |
| CA | 2010076 | 8/1990 |
| CA | 1306411 | 8/1992 |
| CA | 2064300 | 9/1992 |
| DE | 3883517 | 5/1994 |
| DE | 69208910 | 8/1996 |
| DE | 19734316 A1 | 2/1999 |
| DK | EP 0506601 | 5/1996 |
| EP | 0122656 | 10/1984 |
| EP | 0210304 A1 | 2/1987 |

| | | |
|---|---|---|
| EP | 0280296 A2 | 8/1988 |
| EP | 0351079 A3 | 1/1990 |
| EP | 0506601 | 9/1992 |
| EP | 0685014 B1 | 6/1997 |
| EP | 0913271 | 10/1998 |
| EP | 0989227 A2 | 3/2000 |
| FR | 2543984 | 10/1984 |
| FR | 2659094 | 9/1991 |
| FR | 2784619 A1 | 10/1998 |
| FR | 2846202 A1 * | 4/2004 |
| GB | 1171296 | 11/1969 |
| GB | 1466271 | 12/1973 |
| GB | 2065031 A | 12/1979 |
| GB | 2126951 A | 9/1983 |
| GB | 2214869 | 9/1989 |
| GB | 0506601 | 9/1992 |
| IE | 55104 | 4/1984 |
| IT | 0329787 | 8/1993 |
| IT | 24637BE/96 | 6/1996 |
| JP | 55079143 | 6/1980 |
| JP | 56-147171 | 11/1980 |
| JP | 356058824 A | 5/1981 |
| JP | 56107080 | 8/1981 |
| JP | 56108565 A | 8/1981 |
| JP | 56141877 A2 | 11/1981 |
| JP | 358062027 A | 4/1983 |
| JP | 359115885 A | 7/1984 |
| JP | S61-146368 | 7/1986 |
| JP | 64-61299 | 3/1989 |
| JP | 5-201196 | 8/1993 |
| JP | 08-267625 | 10/1996 |
| JP | 2001270019 A * | 10/2001 |
| KR | 220373 | 9/1999 |
| KR | 2003063833 | 7/2003 |
| NO | 306099 | 6/1989 |
| TW | 62640 | 7/1993 |
| WO | WO 79/01146 | 12/1979 |
| WO | WO 89/01829 | 3/1989 |
| WO | WO 90/09289 | 8/1990 |
| WO | WO 94/19530 | 9/1994 |
| WO | WO 02/09925 A1 | 2/2000 |
| WO | WO 02/07959 A1 | 1/2002 |
| WO | WO 02/058854 A1 | 12/2002 |
| WO | WO 03/031083 A1 | 4/2003 |
| WO | WO 2004/005023 | 1/2004 |
| WO | WO 2004/005413 | 1/2004 |
| WO | WO 2004/005600 | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

U.S. Appl. No. 10/455,541, filed Jun. 4, 2003, Abrams.
U.S. Appl. No. 10/455,575, filed Jun. 4, 2003, Abrams.
U.S. Appl. No. 10/614,340, filed Jul. 3, 2003, Abrams.
U.S. Appl. No. 10/613,982, filed Jul. 3, 2003, Abrams.
U.S. Appl. No. 10/614,399, filed Jul. 3, 2003, Abrams.
U.S. Appl. No. 10/670,091, filed Sep. 23, 2003, Abrams.
Advertisement, "Sewfree: Adhesive Film for Seamless Apparel Construction," (Sep. 2002), 1 page.
Advertisement,"Clarense" at www.bemisworldwide.com (undated), 2 pages.
Abrams, Brown, "Flocking A Touch of Velour" *ScreenPrinting* (Aprl. 1987).
Abrams, Brown, "Part II: Flocking" *ScreenPrinting* (Jun. 1987).
Bostik USA; "Automotive & Industrial Division: Web & Powder Adhesives" (2002), available at http://www.bostik.com/oem/web_adhesives.html, 2 pages.
Declaration of L. Brown Abrams under 37 CFR §1,132, dated Jan. 7, 2003.
Landwehr, Rebecca, "When is a mouse pad really a rug?" *The Denver Business Journal* (Nov. 1998), at http://denver.bizjournals.com/denver/stories/1998/11/30/story3.html.
Lextra® MouseRug®; "About the Product" (Jan. 27, 1999), http://www.mouserug.com/mouserug/aboutmouserugs.html, 2 pages.
Lextra® MouseRug®; "MouseRug Components" (Jan. 27, 1999), http://www.mouserug.com/mouserug/mousecomp.html, 1 page.
Lextra® MouseRug®; "Dimensions" (Jan. 27, 1999), http://www.mouserug.com/mouserug/dimensions.html, 1 page.
Uknown author, "Spandex can now be made from Thermoplastic Polyurethane using a new breakthrough flexible process," printed Oct. 10, 2002, available at http://www.2456.com/eng/feature/printed.asp?fsid-204, 4 pages.
"Bicomponent Fibers", available at http://web.utk.edu/~mse/pages/Textiles/Bicomponent%20fibers.htm, Undated Apr. 2004, 8 pages.
U.S. Appl. No. 29/058,551, filed Aug. 19, 1996, Abrams.
U.S. Appl. No. 09/548,839, filed Apr. 13, 2000, Abrams.
U.S. Appl. No. 11/460,493, filed Jul. 27, 2006, Abrams.
U.S. Appl. No. 11/533,699, filed Sep. 20, 2006, Abrams.
U.S. Appl. No. 11/580,679, filed Nov. 16, 2006, Abrams.
U.S. Appl. No. 11/585,974, filed Dec. 1, 2006, Abrams.
"Characteristics of Commonly Used Elastomers" available at http://www.deerfieldurethane.com/Deerfield-Urethane_Brochure.pdf, date unknown, 4 pages.
"Flockin' to Precision"; Images Magazine; Feb. 1992, 1 page.
"Product Information" Calgard Inc.; available at http://www.celgard.com/products/product-information.cfm; 1 page; undated.
"RMIUG Meeting Minutes—Colorado in the Information Age"; Jan. 14, 1997; 1 page.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Callusuede Products, Inc., "About Flock", Available at http://www.cellusuede.com/navabout.html, KMK Media Group, copyright 2000, 1 pages.
Cellusueda Products, Inc., "FAQ's", Available at http://www.cellusuede.com/faq.html, KMK Media Group, copyright 2000, 2 pages.
Cellusuede Products, Inc. "Fiber Types", Available at http://www.cellsuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Sonics & Materials, Inc., "Chart II Compatability of Thermoplastics" (undated), 1 page.
Stahls', New Product Bulletin; 7 pages, date unknown.
Studt et al.; "Versatality on a roll: Thermoplastic adhesive films"; Collano, Oct. 2002, 8 pages.
Declaration of L. Brown Abrams Under 37 CFR § 1.98 for U.S. Appl. No. 09/735,721 dated Jan. 16, 2004, 2 pages.
Declaration of L. Brown Abrams under 37 CFR §1.98 for U.S. Appl. No. 09/621,830 dated Jan. 7, 2003, 2 pages.
Declaration of L. Brown Abrams under 37 CFR § 1.98 for U.S. Appl. No. 10/394,357 dated Jan. 16, 2004, 4 pages with Appendix A-I.
Declaration of L. Brown Abrams under 37 CFR § 1.98 for U.S. Appl. No. 09/621,830 dated Jan. 16, 2004, 2 pages.
Declaration of L. Brown Abrams under 37 CFR § 1.98 for U.S. Appl. No 10/394,357 dated Jan. 3, 2007, 4 pages with Appendix A-I.
Second Supplemental Declaration of L. Brown Abrams under 37 CFR §1.132 for U.S. Appl. No. 09/546,839 executed Jan. 7, 2003.
Supplemental Declaration of L. Brown Abrams under 37 CFR § 1.132 for U.S. Appl. No. 09/548,839 executed Oct. 23, 2002.
"Polymers", Chemistry, Unit 16, date unknown, pp. 313-325.

* cited by examiner

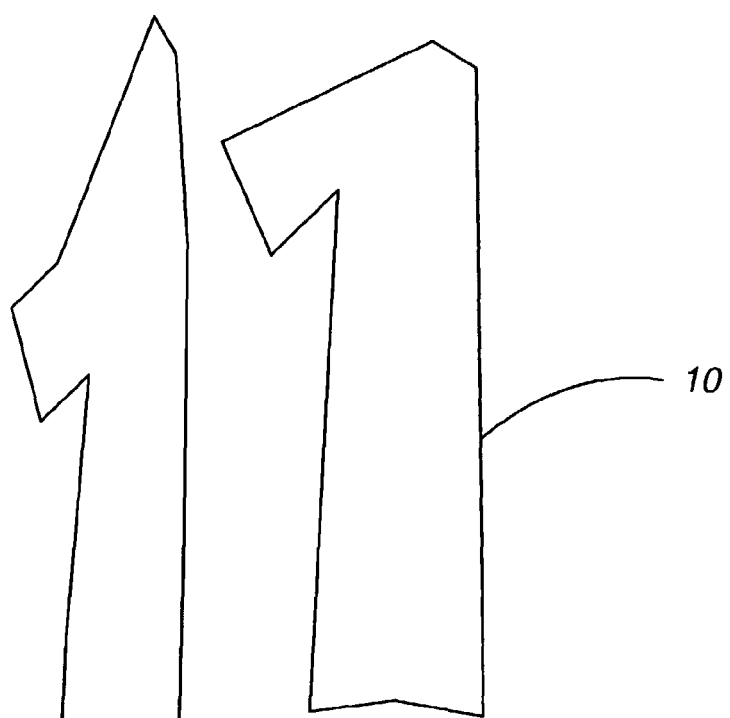
Fig. 5
Fig. 6

FLOCKED STRETCHABLE DESIGN OR TRANSFER

CROSS-REFERENCE TO RELATED APPLICATIONS

The present application claims the benefits of U.S. Provisional Patent Application Ser. Nos. 60/403,992, filed Aug. 16 2002; and 60/405,473, filed Aug. 23, 2002, all to Abrams, each of which is incorporated herein by this reference.

FIELD OF THE INVENTION

This application relates generally to designs and transfers and specifically to a flocked stretchable design or transfer.

BACKGROUND OF THE INVENTION

It is often desirable to decorate clothing or other articles with designs that have various surfaces, such as designs that have a flocked surface such that the surface is fuzzy. Using flocked designs works well with clothes or other articles that are not meant to be stretched. To date, flocked designs have not been used with stretchable articles since the flock adhesive layer and, thus, the design, tends to permanently splits or cracks, sometimes without recovery, as the material is stretched. This is undesirable since the design becomes severely deformed. It is also undesirable since the flock fibers may become detached from the transfer or design, leaving permanent holes, voids, or gaps in the design. Another undesirable aspect of using flocked designs on stretchable articles is that the stretchable article may not reform to its original size and shape near the flocked design due to the adhesive used to keep the flocked design on the clothing or article.

Today's fashions are often characterized by stretchable materials, whether the stretchable material is a knitted material, nylon, polyester, elastic or other material. Thus, a wide market of clothing does not use flocked designs because of the undesirable characteristics associated therewith. What is needed is a flocked stretchable design or transfer that can be stretched with the clothing or other article that will reform to its original design without loss of design quality or adhesion or integrity of the image.

SUMMARY OF THE INVENTION

The present invention describes a flocked stretchable design and a process for producing a flocked stretchable design, appliqué, or transfer. The design can have shape memory even when stretched to a high degree.

In one embodiment, the design is configured as a transfer. The transfer includes a sacrificial carrier layer or release sheet, a release adhesive or binder applied to the carrier layer, a plurality of (preferably multi-colored) flock fibers releasably or temporarily attached to the release adhesive, an elastic (e.g., elastomeric) film, and a first (preferably continuously distributed) activatable adhesive layer (e.g., a thermoset or hot melt thermoplastic adhesive) permanently bonded to a first side of the elastic film. The plurality of flock fibers is permanently bonded to the first side of elastic film using the first activatable adhesive layer. A second activatable, continuously or discontinuously distributed, (elastomeric) adhesive layer is bonded to an opposing, second side of the elastic film.

While not wishing to be bound by any theory, it is believed that, when the second activatable adhesive layer is discontinuously distributed, the gaps or spaces (or discontinuities) in the second activatable adhesive layer may assist the shape memory of the design. The discontinuities in the second activatable adhesive layer may not only provide expansion room for the adhesive when deformed but also prevent the adhesive from flowing into the deformation voids in the adjacent, stretched flock layer by reducing the total mass while still providing effective point-by-point adhesion. The discontinuities are preferably retained after the design is bonded to a suitable substrate. When the second discontinuous activatable adhesive is activated to bond the design to a desirable substrate, it is believed that the second discontinuous activatable adhesive layer soaks, flows, or "wicks" down into the substrate, vertically not laterally, on which the design or transfer is mounted maintaining the voids. This wicking can allow the substrate and the design to stretch at the same rate and reform to their respective original shapes without permanent deformation of either the substrate and the design or the interface between them.

In another embodiment, the design is direct flocked and includes the elastic film, the first (preferably wet coated) activatable adhesive layer, a plurality of flock fibers, and the second activatable adhesive layer. As will be appreciated, the design of this embodiment does not include a transfer carrier layer and a release adhesive.

In other embodiments, the present invention also includes methods of producing both the design of both configurations.

The various embodiments of the present invention can have a number of advantages compared to conventional designs. For example, the stretchable transfer or design of the present invention can prevent the flock fiber adhesive layer from becoming detached from the design or transfer, before, during and after the transfer or design is stretched. The design can have shape memory and can reform, after being stretched, substantially to its original shape and size without loss of original design integrity and aesthetic appeal. The design can, when stretched to a high degree, evidence an increase in the inter flock distance (i.e., the horizontal space between individual fibers) without the flock becoming disengaged from the substrate. The design can combine the multicolored plush design that is attainable with flocked fibers with high elasticity and shape memory. The flock fibers are stable and do not become detached from the design, before, during and after the transfer or design is stretched. The aesthetic quality of the design can be retained after any number of elastic deformations. The design can be applied to a variety of elastic substrates that have previously been unsuitable for flocked designs. Examples include highly elastic substrates such as Lycra®, and elastomeric materials, such as rubber and latex, elastic woven or knit waist band such as for men's underwear or women's panties, etc.

These and other objects, features, and advantages of the invention will become apparent from the following best mode description, the drawings and the claims.

BRIEF DESCRIPTION OF THE DRAWINGS

FIG. 5 depicts a stretchable design, in a non-stretched position.

FIG. 6 depicts a stretchable design, in a fully stretched position.

DETAILED DESCRIPTION OF THE INVENTION

Figure 1:
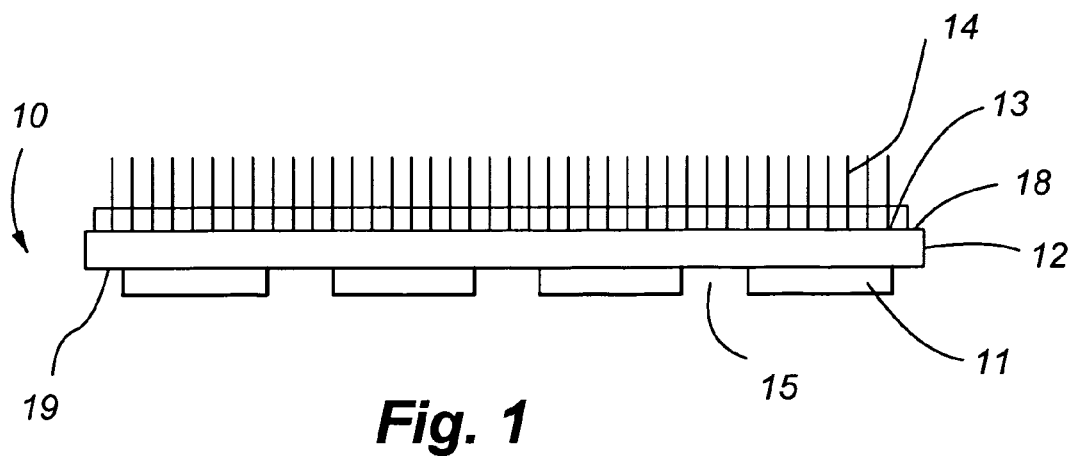
FIG. 1 is a cross-sectional view of one embodiment of the invention as a design, using a direct flock method of flock application.

As shown in FIG. 1, a direct flocked design according to the present invention is shown. The design 10 has an elastic film 12, a first activatable (continuously distributed) adhesive layer 13 bonded to one side of the elastic film, a second activatable, discontinuously distributed, adhesive layer 11 that is applied to the other side of the elastic film, and a plurality of flock fibers 14 that are flocked onto the first activatable adhesive layer. The substantial elasticity imparted by the elastic film to the design 10 is shown in FIGS. 5 and 6. FIG. 5 depicts the design 10 in a non-stretched position while FIG. 6 depicts the design 10 in a fully stretched position.

The elastic film should be durable, thermally stable, and able to resist the various treatments including but not limited to flocking and/or lamination process, applying chemicals, washing, heating, drying, both during the flocking process and after the design or transfer has been heat applied to the article. The term "elastic" as used herein means those materials that have the ability to regain, at least substantially, their original shape after a load is removed. The elastic film preferably has a modulus of elasticity of less than about 11.25 pounds per foot ("lbf") (50 N). The modulus of elasticity for the material selected is preferably above about 0.5 lbf (2.22 N) (where the modulus is defined as the force required to pull a ¼ inch sample from 3 inches to 6 inches). As the modulus of elasticity (Young's Modulus) is a fundamental material constant, the modulus is an index of the stiffness of the material. A higher value of the modulus indicates a more brittle material (i.e. glass, ceramics). A very low value represents a elastomeric material (i.e. rubber). The elastic film preferably has an elongation of at least about 200% and more preferably at least about 300% and a recovery of at least about 75% and more preferably at least about 95%. The recovery is the percent of the film's shape retained after the film is stretched to 100% of its original length at a rate of 30 inches per minute and the stretched film allowed to retract freely for 1 minute.

The elastic material can be of any suitable composition, such as rubber, polyurethane, and elastomers. Particularly preferred elastic materials include natural vulcanized rubber and elastomers, such as styrene-butadiene copolymer, polychloroprene (neoprene), nitrile rubber, butyl rubber, polysulfide rubber (Thiokol), cis-1,4-polyisoprene, ethylene-propylene terpolymers (EPDM rubber), silicone rubber, (thermoplastic) polyurethane such as Spandex, and polyurethane rubber. As will be appreciated, "elastomers" refer to synthetic thermosetting (typically high) polymers having properties similar to those of vulcanized natural rubber, namely the ability to be stretched to at least twice their original length and to retract quickly to approximately their original length when released. It has been found that materials with the trade name Clarense® from Bemis, Lycra® from Du Pont, and Dorlastan® from Bayer work well with the present invention.

The elastic film preferably has a thickness ranging from about 1 mil to 25 mils and more preferably, from about 1 mil to 15 mils.

The first activatable adhesive layer 13 is applied to the elastic film 12. The first activatable adhesive layer is preferably distributed continuously over the first surface 18 of the elastic film. The first activatable adhesive preferably has a thickness ranging from about 1 mil to 10 mils and more preferably from about 1 mil to about 3 mils. The first activatable adhesive layer provides a permanent grip of the flock fibers. The first activatable adhesive layer can be applied to the elastic film in any number of ways, e.g., applied as a liquid using suitable techniques or as a pre-formed film and either can be applied to the flock fibers simultaneously. Suitable adhesives for the first activatable adhesive are described in detail below.

The plurality of flock fibers 14 are flocked onto the first activatable adhesive layer through general and conventional flocking methods and techniques. The flock can be of multiple colors, which can be arranged in a pre-selected design, or can be of a single color. The flock 14 used in any of the processes discussed herein can be any electrostatically chargeable fiber, such as fibers made from rayon, nylon, cotton, acrylic, and polyester. Preferably, the flock has a melting and/or softening point that is greater than the temperatures experienced by the flock during activation of the first and second adhesives. Due to its low melt point, acrylic flock is undesirable in many applications. The flock is also preferably resilient under the temperatures and pressures experienced in design manufacturing and later application processes to resist softening, deformation, and melting. Resilient flock, such as rayon, nylon, and terepthalate (e.g., poly(cyclohexylene-dimethylene terephthalate) polymer flock, is particularly preferred. In most applications, the flock orientation is at least substantially orthogonal (perpendicular) to the first side of the elastic film.

In accordance with the present invention, to achieve a multicolor and/or textured effect, the flock 14 is applied through the image screen which is preferably a gauze-like mesh screen made of polyester monofilament material or by inkjet printing or sublimation transfer before the first and second activatable adhesive layers and elastic film are applied to the flock. The multicolor effect is achieved by using different precolored flock. A textured effect is achieved by using flock fibers of different length and passing flock fibers of substantially the same or uniform length in batches through the open section of the barrier. As used herein, precolored flock means that the flock has been colored before being flocked, adhered stuck or otherwise applied to the release adhesive. Depending on the overall design texture and the color or number of colors of flock which are to be used, an appropriate number of barriers or screens are prepared to have open sections to permit passage of flock in a predetermined configuration, texture pattern, and/or color pattern. Alternatively, a single screen may be sequentially masked for this purpose. In either case, the open sections of each mask or screen are designed to permit passage of flock fibers in a configuration which corresponds to areas of the final design including any surrounding bleed areas which correspond to only one color and/or flock length, which is preferably one of a plurality of colors and/or fiber lengths of a color and/or texture pattern, intended to be used in the final or overall design. The screen also serves to mask areas which are not intended to receive a particular color or texture. In accordance with the present invention, each different color and/or different length of flock is preferably applied sequentially using a different screen to result in the particular precolored flock and/or flock of predetermined length passing through the open section of the screen onto a corresponding section of the release adhesive 21 to form a color and/or texture pattern.

The present invention generally utilizes the general materials and flocking techniques found in U.S. Pat. Nos. 3,793,050; 4,292,100; and 4,396,662 and UK patent application Nos. 2,065,031 and 2,126,951 all of which are incorporated by reference herein. The present invention can also utilize flocking materials and techniques such as those described in U.S. Pat. Nos. 4,810,549; 5,047,103; 5,207,851; 5,346,746; 5,597,637; 5,858,156; 6,010,764; 6,083,332; and 6,110,560 as well as copending patent applications U.S. application Ser. Nos. 29/058,551 filed Aug. 19, 1996; 09/548,839 filed Apr. 13, 2000; 09/621,830 filed Jul. 24, 2000; 09/735,721 filed Dec. 13, 2000; 09/629,746 filed Jul. 31, 2000; 09/973,113 filed Oct. 9, 2001; 60/327,642 filed Oct. 5, 2001; 60/344,863 filed Nov. 8, 2001; 60/366,580 filed Mar. 21, 2002; 60/332/,647 filed Nov. 21, 2001 and 60/393,362 filed Jul. 3, 2002, 10/265,206 filed Oct. 4, 2002, and 10/394,357, filed Mar. 21, 2003, of which I am an inventor. These patents and patent applications are also incorporated herein as if set forth in their entireties.

Returning again to FIG. 1, the second activatable, discontinuously distributed, adhesive layer 11 is applied to the second side 19 of the elastic film 12 and is not adjacent to the first activatable adhesive layer 13 or a continuous hot melt stretch layer 11 could be pre-laminated to stretch layer 18 or directly coated with engraved cylindrical die.

The term "discontinuous" means that the adhesive, when applied to the elastic film, does not coat the entirety of the film but allows for holes or voids, shown in FIGS. 1 through 4 as voids 15, between adjacent areas of the adhesive. The voids can allow the transfer or design to recover its original shape after stretching without deforming the substrate material on which the transfer or design is bonded. As will be appreciated, the discontinuous nature of the second activatable adhesive can be present before the application of the adhesive, such as a pre-formed film adhesive with holes, can be formed during application of the adhesive, or formed after application of the adhesive by removing selected portions of the adhesive (such as by using a mask).

To prevent elimination of the voids when the discontinuous adhesive film is thermally adhered to the elastic film and/or substrate, it is preferred that the viscosity of the adhesive film be high enough such that there is no lateral flow together to melt and flow into the voids between the adhesive segments. The thickness of the second activatable, discontinuously distributed, adhesive layer preferably ranges from about 1 mil to 25 mils and more preferably from about 2 mils to 10 mils and even more preferably from about 2 mils to 5 mils.

Any suitable adhesive can be used for the first and second activatable adhesives. The first and second activatable adhesives typically have differing compositions. As will be appreciated, suitable adhesives fall into two general categories, namely organic and inorganic adhesives, with organic adhesives being preferred. Although either natural organic or synthetic adhesives are suitable, synthetic adhesives are preferred. Synthetic adhesives include elastomer-solvent cements, thermoplastic resins (for hot-melts) (e.g., polyethylene, isobutylene, polyamides, and polyvinyl acetate), thermosetting resins (e.g., epoxy, phenoformaldehyde, polyvinyl butryal, and cyanoacrylates), polyesters, polynrethanes, and silicone polymers and cements. Of the synthetic adhesives, thermoplastic (hot melt) resins and thermosetting resins are preferred. Thermoset adhesives solidify or set irreversibly when heated above a certain temperature. This property is usually associated with a cross-linking reaction of the molecular constituents induced by heat or radiation.

Suitable thermoset adhesives can include curing agents or catalysts such as organic peroxides, sulfur, isocyanate, oxalic acids, or diammonium phosphate. Thermosetting resins such as methylol-melamines, urea formaldehyde condensates or phenol formaldehyde condensates may be incorporated to improve durability or abrasion resistance of the design. Suitable examples of thermosetting adhesives include polyethylene, phenolics, alkyds, amino resins, polyesters, epoxides, and silicones. For use with the present invention a polyester, a polyurethane, or a polyamide second activatable, discontinuously distributed, adhesive layer is preferred.

The adhesive can have any form, namely be in the form of a liquid, solid (such as a pre-formed film), or a gas (which is condensed onto the desired surface). As will be appreciated, liquid adhesives include without limitation, water-based, solvent based, or curable liquid systems. Water-based adhesives generally consist of a binder, usually an emulsion polymer, and a viscosity builder. Water-based adhesives may also contain plasticizers, thermosetting resins, curing catalysts, stabilizers and various other additives known in the art. The emulsion polymer is generally chosen from acrylic, vinyl-acrylic, vinyl, urethane, and styrene-butadiene latexes. The viscosity is dictated by the substrate and the specific adhesive. Suitable viscosity builders are typically water soluble polymers such as such as carboxymethyl cellulose, hydroxyethyl cellulose, polyoxyethylenes and natural gums as well as alkyl swellable polymers, such as, highly carboxylated acrylic emulsion polymers.

Plasticizers may be added to alter the properties of the design or to improve the flow and levelling characteristics of the adhesive. Where the primary goal is the latter, fugitive plasticizers, such as, the phthalate esters may be employed. If the intent is to alter the properties of the finished goods, then more permanent plasticizers such as low molecular weight polyesters may be used.

Solvent adhesives include those fully reacted soluble polymers, such as, acrylic homo and copolymers, polyesters, polyamides or polyurethanes and two package systems, such as, polyester polyols with diisocyanates, or isocyanate prepolymers and epoxies with polyamines. The polymer or prepolymer is dissolved in a suitable solvent which is preferably low boiling, and then thickened to the proper viscosity in a manner similar to that used for the water-base adhesives. Catalysts, cross-linking agents, stabilizers, pigments, or dyes may also be incorporated.

Figure 9:
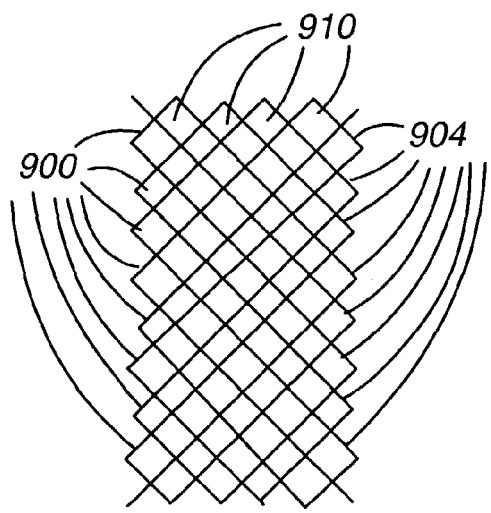
FIG. 9 depicts a plan view of the second adhesive layer according to another embodiment of the present invention.

Curable liquid systems include 2 part urethanes, e.g., a dlisocyanate and a polymeric polyol, flexible epoxy systems, e.g., liquid epoxy resins or solutions of solid epoxy resins co-reacted with polyamides or polyamines and dimercaptans and a polyene with a peroxide. Also, hot melts can be used, such as polyethylene-vinylacetate copolymer, polyethylene-ehylacrylate copolymer, and a plasticized polyvinyl chloride in the form of a plastisol which can be heated to fuse and then cure. In one design configuration, the first activatable adhesive is preferably a thermoset adhesive while the second activatable adhesive is preferably a hot melt thermoplastic adhesive. The preferred adhesive for the first activatable adhesive is a thermosetting or thennoplastic hot melt film. To provide the desired discontinuities 15, preferred, pre-formed adhesive films for the second activatable adhesive include (spun) web adhesives such as the Sharnet® adhesive from Bostik-Findley. FIG. 9 depicts a spun web adhesive in plan view. As can be seen from FIG. 9, the adhesive film comprises a network of intersecting filaments 900 and 904 forming voids 910 between adjacent filaments. The first filaments 900 in the first set of filaments are parallel to one another, and the second filaments 904 in the second set of filaments are parallel to one another. The first filaments 900 are transverse to the second filaments 904. Sharnet® is a high performance adhesive produced in a nonwoven fabric foam. Web adhesives, such as the Sharnet® adhesive, can be applied through either a manual or automatic process to accommodate both application to individual articles and continuous line feed operations.

Figure 2:
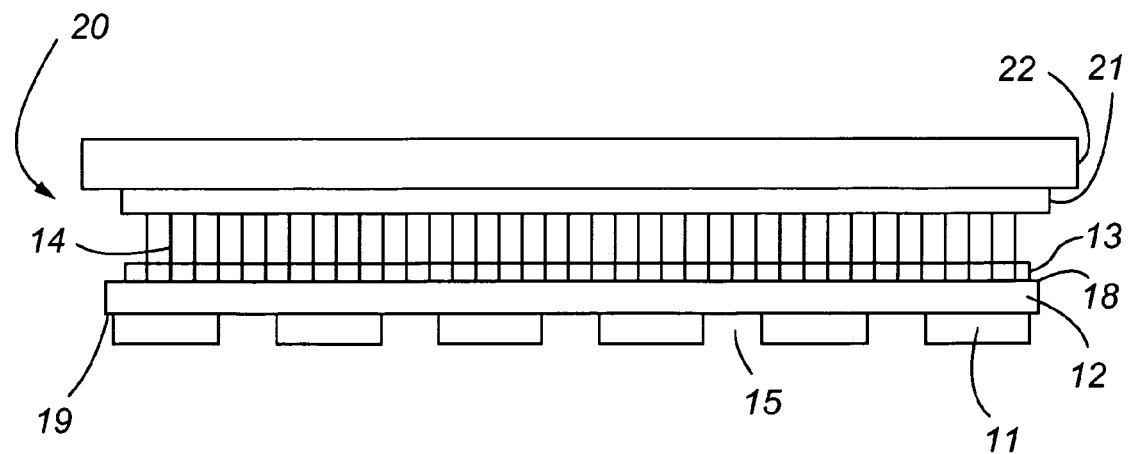
FIG. 2 is a cross-sectional view of another embodiment of the invention as a transfer, using a transfer method of flock application

FIG. 2 shows the design in the form of a transfer. The transfer 20 includes the elements of the design 10 described above and additionally includes a carrier film or sheet 22 and a release adhesive 21. The carrier film can be any type of material which is suitable for use on a temporary basis and which is relatively inexpensive inasmuch as it usually is only used once and disposed. Typically, carrier films can include but are not limited to paper, plastic, fabric, metallic foil and the like. Other carrier films, such as a backdrop or backcloth, which are suitable for reuse may also be used with the present invention. The carrier film should, however, be able to withstand the various flocking, coating and other treatments to which it will be subjected.

The release adhesive 21 is applied to the carrier film to bind the flock fibers in a certain orientation before the flock fibers are collectively bonded by the first activatable adhesive layer. The release adhesive is a composition which when subjected to the usual curing conditions, e.g., heat, ultra-violet, etc., will not permanently set or permanently adhere to the substrate or to the flock. Such compositions typically include but are not limited to waxes, low molecular weight polyethylenes, polystyrenes, hot melt slurries (such as polyesters, polyamides, polyethylenes, and urethane hot melt), and the like. Additionally, starched-based adhesives such as, canary dextron and British Gum; gums, such as gum arabic and gum tragacanth; water soluble, non-curing polymers, such polyvinyl alcohols, particularly hydrolyzed polyvinyl acetate and the like may be used. Another example of appropriate composition is glycerine and urea.

To produce a transfer according to the present invention and with reference to FIG. 2, a carrier film 22 is provided and a release adhesive 21 is applied to the carrier film. The release adhesive can be applied to the carrier layer in any manner, including by means of a knife or with roll, stipple roller, spray or other methods including but not limited to those methods described in U.S. Pat. Nos. 4,810,549; 5,047,103; 5,207,851; 5,346,746; 5,597,637; 5,858,156; 6,010,764; 6,083,332; and 6,110,560, of which I am an inventor. These patents are incorporated herein as if set forth in their entireties. After application of the release adhesive to the carrier layer, one end of the plurality of flock fibers 14, in the reverse of the desired pattern, is then deposited onto and in the release adhesive 21 and dried. The dried plurality of flock fibers can now be vacuumed to remove excess or loose fibers. The free or exposed ends of the plurality of flock fibers (i.e., the ends which are not attached to the release adhesive) are coated with the first activatable adhesive layer. At the same time, the first activatable adhesive layer is contacted with the first side 18 of the elastic film. The first activatable adhesive layer is then dried and fully activated or cured. The second activatable adhesive layer is then applied to the second side 19 of the elastic film. The second activatable adhesive layer can then be dried and partially activated for later application to a suitable substrate. It should be noted that with either the direct flock or transfer methods, the process can be performed as a continuous line operation or can be performed in separate stages.

To produce the design 10 through a direct flock method according to the present invention and with reference to FIG. 1, an elastic film 12 is provided. The first side 18 elastic film 12 is coated with a first activatable (liquid) adhesive film 13. The plurality of flock fibers 14 is directly deposited, in the desired pattern, onto and in the first activatable film 13. The first activatable adhesive layer can then be dried and cured (fully activated). The second activatable, discontinuously distributed, adhesive layer is applied to the elastic film on the second side 19 opposite that of the flock. The second activatable adhesive is then dried and cured (partially activated). The flock can be vacuumed at any time after the flock is applied in order to remove any excess or loose flock fibers. As will be appreciated, the first and second activatable adhesive layers can be applied to the elastic film in any order.

Figure 10:
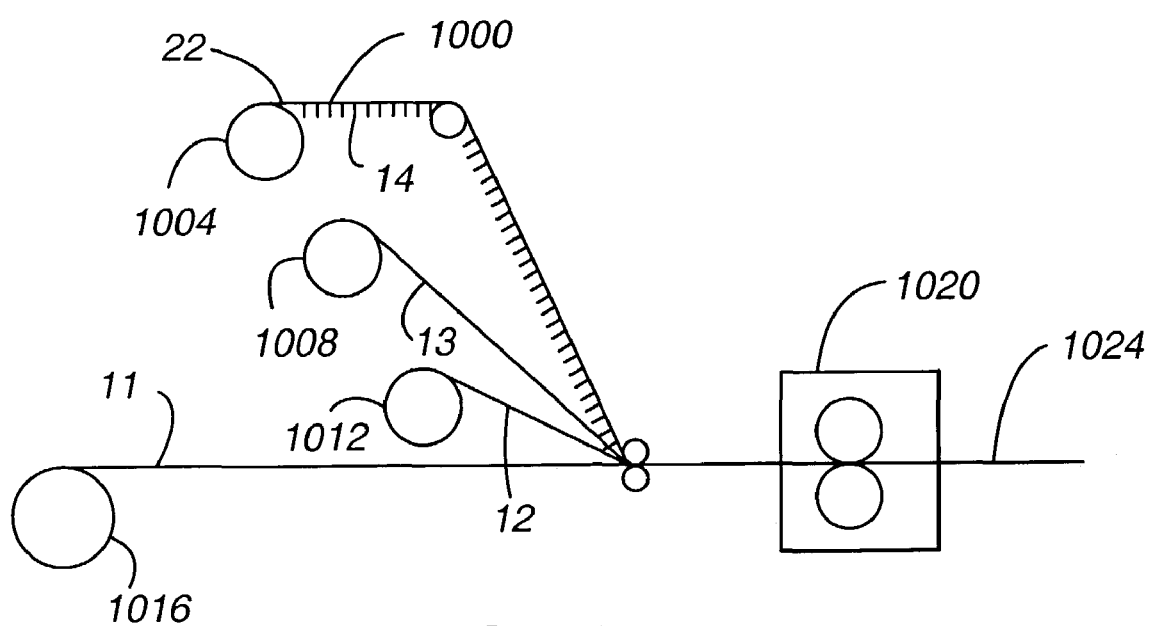
FIG. 10 depicts a side view of a system to manufacture a design according to another embodiment of the present invention.

In one continuous process configuration shown in FIG. 10, the first and second activatable adhesive layers, elastic film, and flocked release sheet are laminated simultaneously. A design 10 is formed by first depositing the flock 14 on the release adhesive which is located on the carrier sheet 22, to form a flocked carrier sheet 1000. The flocked carrier sheet 1000 is positioned on a roll 1004. The release adhesive temporarily holds the flock in position on the sheet 22. The release adhesive and/or flock can be deposited over the entire surface of the sheet 22 or discontinuously over the sheet 22 in a desired pattern, as in the case of multiple colors of flock (each color is applied to the release adhesive in a desired pattern in separate steps with each pattern being nonoverlapping or disjoint). Additional rolls 1008, 1012, and 1016, respectively, are provided for the preformed (cast or extruded) first permanent adhesive film 13, the performed (cast or extruded) elastic film 12, and the performed (cast or extruded) second permanent adhesive film 11. The flocked carrier sheet 1000 is then contacted substantially simultaneously with the (preformed) first adhesive film 13, the (preformed) second adhesive film 11, and (preformed) elastic film 12 and laminated in a lamination machine 1020 by thermal techniques to form a continuous length of material 1024 comprising a a plurality of designs 10. During lamination, the various layers are heated to a temperature sufficient to partially or fully activate (e.g., crosslink) the adhesives 11 and 13. The length 1024 can then be cut into desired shapes to form the designs 10. This process can be continuous using a running web line.

Figure 3:
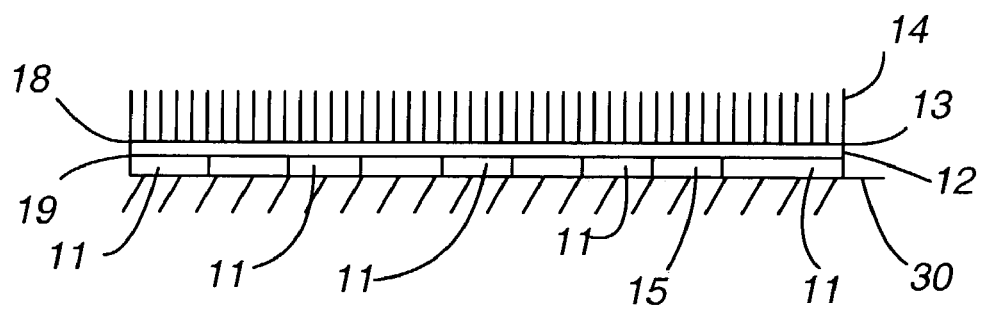
FIG. 3 is a cross-sectional view of another embodiment of the invention as an design mounted on a substrate.

FIG. 3 also shows a substrate 30 on which the design, transfer or patch will be mounted. The substrate can be any material to which it is desired to attach the transfer, design or sew on patch. The substrate can also be an elastic/elastomeric material, such as Lycra and like materials; however, the stretchable transfer or design of the present invention can also be used in conjunction with molded articles. Preferably, the substrate has a same or similar modulus of elasticity as the elastic film of the transfer or design. This allows the substrate and the transfer or design to stretch at similar rates. Even more preferably, the design has an elasticity that is substantially the same as or greater than the elasticity of the substrate. Preferably, the amount of stretch of the design and substrate is at least about 200% of their original sizes.

Figure 4:
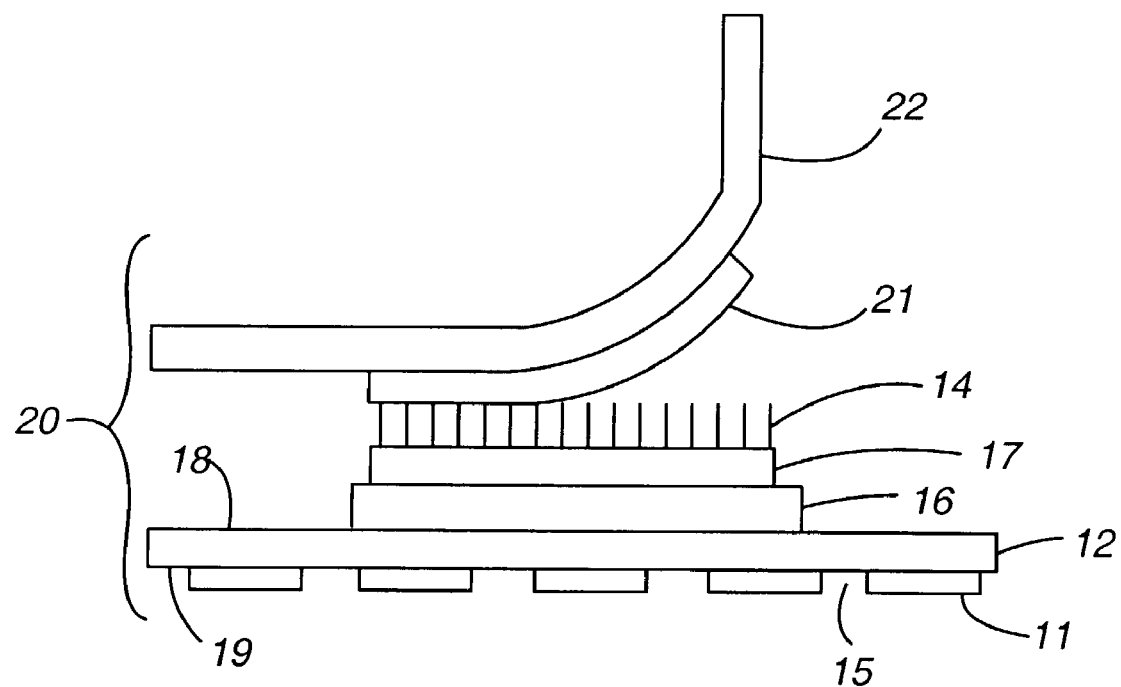
FIG. 4 is a cross-section view of another embodiment of the present invention, having a dual first activatable adhesive layer.

FIG. 4 shows a dual layer thermoset arrangement which falls within the scope of the present invention. The dual layer thermoset arrangement comprises a hot melt layer 16 and a binder adhesive layer 17 in place of the first activatable adhesive layer 13 discussed above. It should be understood that the present invention encompasses a layer where the binder adhesive and the hot melt form only one layer. The flock 14 is coated with a binder adhesive 17, such as a water based acrylic, which binds the flock into a unit and is a barrier for the hot melt. Preferably the binding adhesive is applied in the form of a solution or emulsion. The binder adhesive preferably contains a resin, such as polyvinyl chloride, polyvinyl acetate, polyurethane, polyester, polyamide, and acrylic resin, and preferably the previously mentioned water based acrylic. A preferred binder adhesive is commercially available as Tubitrans Bond manufactured by Chemische Fabrik Tubitrans R. Beitlich GmbH & Co. Turbitrans Bond is an acrylic dispersion which is cross-linkable at higher temperatures in the form of a high viscosity, white paste. The acrylic dispersion has a viscosity of cp. 4.5-4.6 measured with Contraves Viscometer, type Eppprecht, Instrument and a pH of about 7-8. This acrylic resin dispersion may be mixed with Tubitrans Fix 2 and optionally further with a colormatch dyestuff. A preferred release adhesive, therefore, would be 100 parts Tubitrans Bond, 8 parts Tubitrans Fix 2, and 0-3 parts colormatch dyestuff. The binder adhesive 17 may contain additional or supplemental adhesives, such as a hot melt adhesive, usually a granular polyester or nylon, for binding the transfer to a substrate.

The hot melt adhesive 16 is then applied to the binder 17 as a separate layer. In addition, other heat sensitive adhesives, such as polyvinyl chloride, thermoplastic acrylic resin, polyethylene, polyamide, polyurethane, paraffin and rubber derivative may be used for this purpose, with polyurethane being preferred.

In an alternative embodiment, the second activatable layer is continuously distributed as opposed to being discontinuously distributed. To prevent loss of shape memory or design appearance, the adhesive layer is selected to have the proper stretch and recovery characteristics. Examples of suitable adhesives include polyurethanes, polyesters, polyamides, polyolefins, and other elastomeric adhesives.

In one alternative embodiment, the elastic film 12 of the present invention can be used as the film backing of a co-molded direct flock and flock transfer such as that described in U.S. patent application Ser. No. 60/393362, filed Jul. 3, 2002, or in place of the barrier layer 204 described in FIG. 9 of the same application. This patent application is incorporated herein as if fully set forth.

In another alternative embodiment, the elastic film 12 and second activatable adhesive layer 11 of the present invention can also be used as an optional layer in the screen printed resin film design or transfer made from a liquid plastic dispersion such as that described in U.S. patent application Ser. Nos. 60/332,647, filed Nov. 21, 2001; 60/344,862 filed Nov. 8, 2001; and 60/327,642, filed Oct. 5, 2001. The entireties of these patent applications are incorporated herein as fully set forth.

In yet another alternative embodiment, the design is configured as a sew-on patch. When so configured, the second activatable adhesive layer can be eliminated or can be used sparingly to provide additional bonding capabilities, such as alignment before stitching. The elastomeric film provides integrity and can be sewn on.

Figure 7:
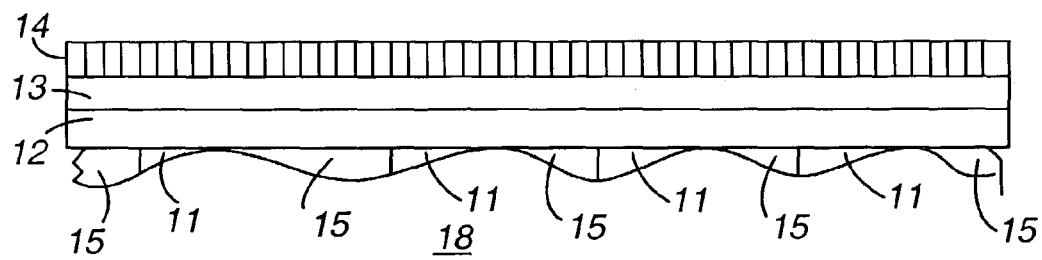
FIGS. 7 and 8 depict cross-sectional, detailed views of another embodiment of the present invention, showing the voids in detail.
Figure 8:
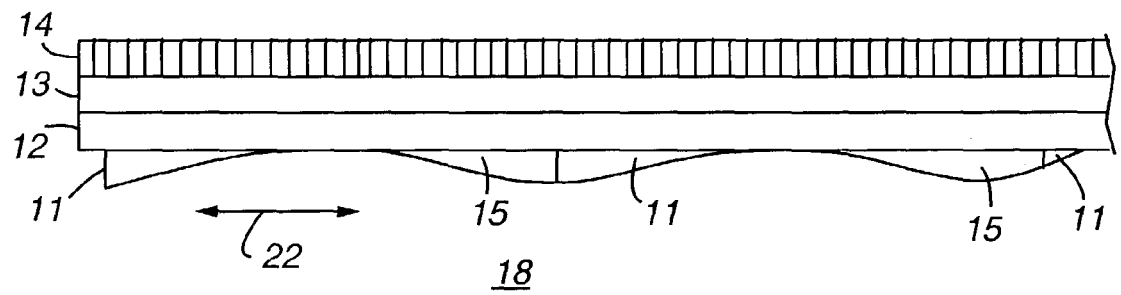

As one can observe from FIGS. 7 and 8, in one embodiment of the invention, the flock fibers 14 are embedded in the first activatable adhesive layer 13 and the elastic film 12. The second activatable adhesive layer 11, shown in a discontinuous form, bonds to the elastic film 12 and woven textile 18 and also creates voids 15. While not wishing to be bound by any theory, it is believed that the elastomeric film 12 stretches horizontally while the fibers are held intact by the adhesive 13. When released, the design resumes its original design without visible gaps in the flock fibers. It is believed that this phenomenon keeps the flock fibers embedded in the first activatable adhesive layer and the elastic film in a vertical orientation while allowing the interflock fiber distance (i.e., the horizontal distance between two individual flock fibers) to increase.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A flocked article, comprising:
   a plurality of flock fibers;
   an elastic film having first and second sides, the elastic film comprising rubber and/or an elastomer;
   a first thermoset adhesive layer bonded to the first side of the elastic film and to the plurality of flock fibers, the first thermoset adhesive layer being substantially continuously distributed over the first side of the elastic film and fully activated; and
   a second thermoplastic adhesive layer bonded to the second side of the elastic film, the second adhesive layer comprising a plurality of void spaces.

2. The article of claim 1, wherein the second adhesive layer is substantially discontinuously distributed over the second side of the elastic film, wherein the void spaces expose the second side of the elastic film, and further comprising:
   a carrier; and
   a release adhesive deposited upon the carrier, wherein the plurality of flock fibers are releasably attached to the release adhesive.

3. The article of claim 1, wherein the elastic film has a modulus of elasticity of less than about 11.25 lb/ft and more than about 0.5 lb/ft.

4. The article of claim 1, wherein the elastic film has an elongation of at least about 200%.

5. The article of claim 1, wherein the elastic film is a thermosetting elastomer and has a recovery of at least about 75% after being stretched to 100% of the film's length and allowed to retract freely.

6. The article of claim 1, wherein the elastic film is at least one of a rubber, styrene-butadiene copolymer, neoprene, polyisoprene, polyester, polyamide, polypropylene, polyethylene, and polyurethane.

7. The article of claim 1, wherein the elastic film is a thermoplastic polyurethane.

8. The article of claim 1, wherein the elastic film is a fully thermoset elastomer.

9. The article of claim 1, wherein the elastic film has a thickness ranging from about 1 to about 25 mils.

10. The article of claim 1, wherein the first adhesive layer is free of discontinuities.

11. The article of claim 1, wherein the second adhesive layer is elastomeric, and further comprising:
    a substrate bonded to the second adhesive layer, the second adhesive layer being positioned between the elastic film and substrate, wherein the substrate is at least one of elastic and elastomeric, and wherein the elastic film has an elasticity the same as or greater than an elasticity of the substrate.

12. The article of claim 1, wherein the first adhesive layer is selected from the group consisting of polyethylene, butryals, acrylates, aldehydes, polyurethanes, phenolics, alkyds, amino resins, polyesters, epoxides, silicones, and mixtures thereof.

13. The article of claim 1, wherein the first adhesive layer has a thickness ranging from about 1 to about 10 mils.

14. The article of claim 1, wherein the second adhesive layer is selected from the group consisting of polyethylenes, isobutylenes, polyesters, polyurethanes, polyamides, poly(vinyl acetate), and mixtures thereof.

15. The article of claim 1, wherein the second adhesive layer has a thickness ranging from about 1 to about 25 mils.

16. The article of claim 1, wherein the second adhesive layer is porous and the first adhesive layer is nonporous.

17. The article of claim 11, wherein the second adhesive layer is a hot melt polyester web adhesive.

18. An article, comprising:
a plurality of flock fibers;
an elastic film having first and second sides, wherein the elastic film comprises rubber and/or an elastomeric material and wherein at least one of the following is true: (i) the elastic film has a modulus of elasticity of less than about 11.25 lb/ft and more than about 0.5 lb/ft, (ii) the elastic film has an elongation of at least about 200%, and (iii) the elastic film has a recovery of at least about 75% after being stretched to 100% of the film's length and allowed to retract freely; and
a first thermosetting adhesive layer bonded to the first side of the elastic film and to the plurality of flock fibers, the first thermo setting adhesive layer being fully activated.

19. The article of claim 18, further comprising:
a second thermoplastic adhesive layer bonded to the second side of the elastic film, wherein the first adhesive layer is continuous while the second adhesive layer is discontinuous.

20. The article of claim 19, wherein (i) is true.

21. The article of claim 19, wherein (ii) is true.

22. The article of claim 19, wherein (iii) is true.

23. The article of claim 18, wherein the elastic film is a fully thermoset elastomer.

24. The article of claim 18, wherein the first adhesive layer is free of discontinuities.

25. The article of claim 19, wherein the second adhesive layer includes first and second intersecting sets of filaments, the members of the first set of filaments being transverse to the members of the second set of filaments and wherein holes are located between adjacent members of the first and second set of filaments.

26. The article of claim 19, wherein the first adhesive layer is selected from the group consisting of polyethylene, butryals, acrylates, aldehydes, polyurethanes, phenolics, alkyds, amino resins, polyesters, epoxides, silicones, and mixtures thereof.

27. The article of claim 26, wherein the second adhesive layer is selected from the group consisting of polyethylenes, isobutylenes, polyesters, polyurethanes, polyamides, poly(vinyl acetate), and mixtures thereof and wherein the second adhesive layer is porous and the first adhesive layer is nonporous.

28. An article manufactured by steps, comprising:
(a) contacting flock with a pre-formed and self-supporting first permanent adhesive layer, the first permanent adhesive layer being a thermosetting adhesive;
(b) contacting the first permanent adhesive layer with an elastic film, the flock and first permanent adhesive layer being located on a common side of the elastic film, wherein at least one of the following is true:
(i) the elastic film has a modulus of elasticity of less than about 11.25 lb/ft and more than about 0.5 lb/ft,
(ii) the elastic film has an elongation of at least about 200%, and
(iii) the elastic film has a recovery of at least about 75% after being stretched to 100% of the film's length and allowed to retract freely; and
(c) when the first permanent adhesive layer is in contact with the flock and elastic film, fully activating the first permanent adhesive layer, whereby the first permanent adhesive layer is fully thermoset; and
(d) contacting the elastic film with a second adhesive layer, wherein the second adhesive layer is thermoplastic and wherein the first and second adhesive layers are located on opposing sides of the elastic film.

29. The article of claim 28, wherein contacting steps (a), (b), and (c) are performed substantially simultaneously.

30. The article of claim 29, wherein each of the first permanent adhesive layer, elastic film, and second permanent adhesive layer are preformed before the contacting steps (a), (b), (c), and (d).

31. The article of claim 29, wherein the flock is adhered to a release adhesive located on a carrier before the contacting step (a) and wherein the first adhesive layer is continuous while the second adhesive layer is discontinuous.

32. The article of claim 28, wherein (i) is true.

33. The article of claim 28, wherein (ii) is true.

34. The article of claim 28, wherein (iii) is true.

35. The article of claim 29, wherein the first adhesive layer is selected from the group consisting of polyethylene, butryals, acrylates, aldehydes, polyurethanes, phenolics, alkyds, amino resins, polyesters, epoxides, silicones, and mixtures thereof, wherein the second adhesive layer is selected from the group consisting essentially of polyethylenes, isobutylenes, polyesters, polyurethanes, polyamides, poly(vinyl acetate), and mixtures thereof, and wherein the second adhesive layer is porous and the first adhesive layer is nonporous.

36. The article of claim 28, wherein the second adhesive layer includes first and second intersecting sets of filaments, the members of the first set of filaments being transverse to the members of the second set of filaments and wherein holes are located between adjacent members of the first and second set of filaments.

37. The article of claim 28, wherein the second adhesive layer is porous while the first adhesive layer is not porous.

* * * * *